United States Patent
Swope

[11] 3,911,350
[45] Oct. 7, 1975

[54] DUAL BATTERY CHARGING RATE DEVICE

[75] Inventor: Thelbert A. Swope, Brookpark, Ohio

[73] Assignee: Union Carbide Corporation, New York, N.Y.

[22] Filed: Apr. 9, 1973

[21] Appl. No.: 349,383

[52] U.S. Cl. .................................. 320/22; 320/35
[51] Int. Cl.² ........................................ H02J 7/00
[58] Field of Search .................... 320/35, 36, 22, 23

[56] References Cited
UNITED STATES PATENTS

| | | | |
|---|---|---|---|
| 2,354,877 | 8/1944 | Peters | 320/37 X |
| 2,650,339 | 8/1953 | Christie et al. | 320/23 |
| 2,796,577 | 6/1957 | Arnot | 320/36 X |
| 3,171,076 | 2/1965 | Medlar | 320/35 X |
| 3,453,519 | 7/1969 | Hunter, Jr. | 320/35 X |
| 3,457,489 | 7/1969 | Gentry, Jr. et al. | 320/35 X |
| 3,564,383 | 2/1971 | Wheeler et al. | 320/22 X |

Primary Examiner—J. D. Miller
Assistant Examiner—Robert J. Hickey
Attorney, Agent, or Firm—C. F. O'Brien

[57] ABSTRACT

A dual charging rate device for secondary cells or batteries comprising a transformer coupled to rectifier means and wherein thermal switching means are utilized for automatically coupling resistive means into the circuit so as to change the magnitude of the charging current when the temperature of a component in the device increases to a preselected level.

26 Claims, 10 Drawing Figures

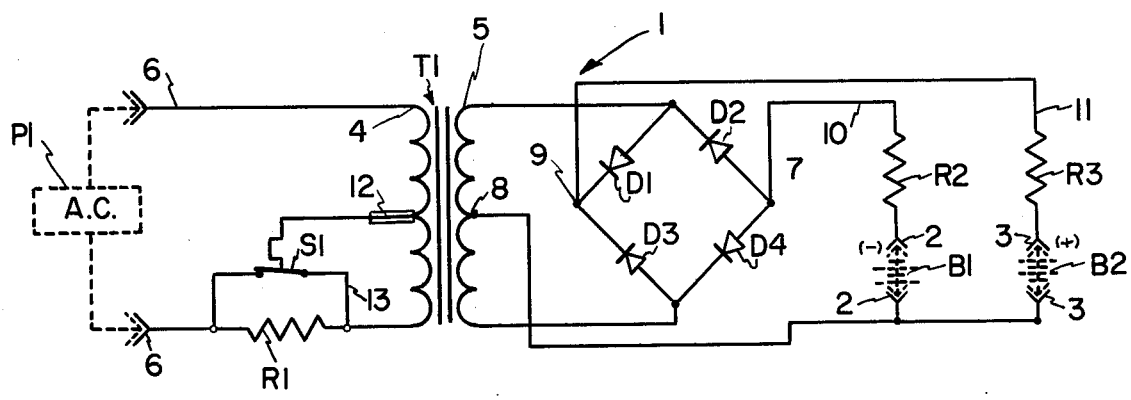
F I G. 1
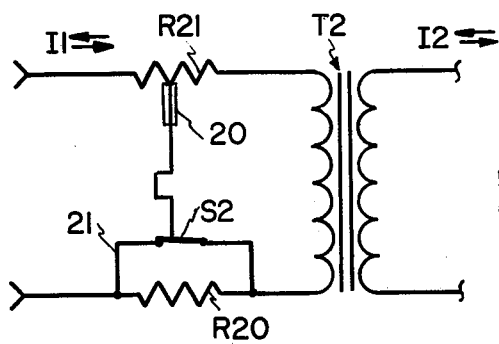
F I G. 2
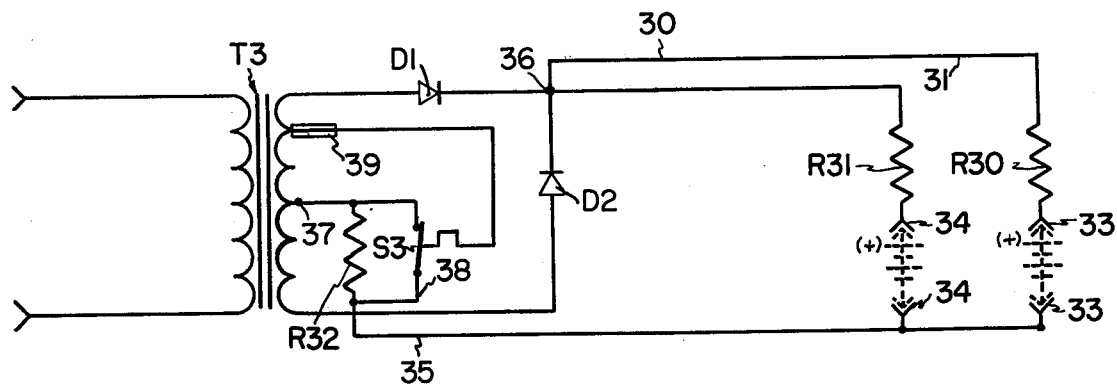
F I G. 3

DUAL BATTERY CHARGING RATE DEVICE

FIELD OF THE INVENTION

This invention relates to an automatic dual charging rate switching device for use with rechargeable batteries.

DESCRIPTION OF PRIOR ART

Many household appliances and light industry apparatus utilize cordless power supplies such as batteries. In recent years the rechargeable or secondary battery has emerged as a prime power supply for such devices, and with the advent of power operable toys and the like, new demands have been made not only for rechargeable batteries, but also for charging units. The basic requirement for a battery charging unit is a source of direct current having a voltage higher than that of a fully charged battery. Many techniques for charging secondary batteries are known, and the circuit components employed in such techniques are usually determined by the amount of control desired over the charging current and/or voltage. For different type secondary batteries, the charging current and voltage requirements are different. Secondary batteries are usually specified with a specific charge rate in terms related to the ampere-hour capacity. The charge rate in amperes is determined by dividing the battery rated capacity in ampere-hours by the desired time of charging in hours, for example, 10 hours, but charging for a somewhat longer time or higher current is usually employed to insure full capacity discharge from the battery. Charge rates in commercial use today range from about 10 hour rate to about 30 hour rate.

Secondary batteries can be charged by constant voltage techniques, constant current techniques, or by taper current techniques. Depending on the particular battery to be charged, one of the above techniques may be preferable over the others.

Most of todays secondary battery units exhibit a "self-discharge" characteristic and consequently when a battery is left on a shelf for a long period of time, it will gradually lose charge or capacity. To maintain a battery in a peak charge condition, it may be advisable to charge the battery on a very low charge rate referred to as a trickle charge. Of course, the trickle rate may vary with different battery units.

Recent nickel-cadmium cells and batteries have been developed that can take a fast charge at a one-hour rate. The "Eveready" Fast Charge Cells manufactured by Union Carbide Corporation not only can be charged at a one-hour rate, but can effectively withstand overcharge at this high rate for a period of time of about 20 minutes or more. Thus with the advent of fast charge cells, shorter recharging times can be used. Various proposals made for charging secondary nickel-cadmium cells and batteries at high rates all require some sort of fail safe means for terminating the high rate charge. If overcharge is continued at too high a rate of charge current, the oxygen gas, which normally reacts or combines with the active cadmium metal on the surface of the negative electrodes, known as the "oxygen recombination" principle, may not fully recombine and consequently result in an excessive internal gas pressure build up. This could not only damage the cell but could cause the cell under certain conditions to explode. One proposal for minimizing overcharge is to incorporate a pressure operated switch in the cell which would automatically cut off the charging current when the internal gas pressure reaches a predetermined level. Another proposal entails the incorporation of an oxygen-consuming auxilary electrode in the cell to consume the oxygen gas as it evolves thereby preventing the build up of excessive internal gas pressure.

It has also been proposed that overcharge can be controlled by using external temperature sensing means to detect the temperature rise of the cell during charging, or by utilizing external voltage sensing means to detect the voltage of the cell during charging, both means of which are indicative of the charge condition of the cell or battery. Unfortunately, the drawback of the former is that with a charge rate of 10 or more hours, the temperature rise of the cell or battery is gradual and difficult to detect, while in the latter, the voltage of a nickel-cadmium cell or battery tends to change with repetitive cycling and may also vary with temperature and charge rate.

Another proposal to safely and reliably terminate charging current prior to excessive overcharge is disclosed in U.S. Pat. application, Ser. No. 31,595 titled "Fast Charge Sealed Secondary Nickel-Cadmium Cell or Battery with Temperature Sensing Overcharge Control", filed Apr. 24, 1970. The approach disclosed is to incorporate a snap-action thermostatic switch on the bottom wall of a cell or battery for sensing the temperature of a cell or battery for sensing the temperature of the cell or battery and then appropriately coupling said switch into a charging circuit so that the charging current in said circuit can be cut-off when the temperature of the cell or battery reaches a predetermined value which would be indicative that the cell is fully charged. Although this approach is suitable, it does require a snap-action thermostatic switch to be in contact with the cell.

The drawbacks of the above charging devices are overcome by the present invention which relates to an economical and safe charger having automatic dual charging rate capabilities which prevent high rate overcharging of a cell while functioning independent of the parameters of the cell.

SUMMARY OF THE INVENTION

The invention relates to an automatic dual charging rate switching device for secondary cells and batteries which is capable of delivering an initial fast charging current followed automatically by a lower charging current comprising:

a. a transformer having primary and secondary windings coupled to at least one primary and at least one secondary sets of terminals, respectively;

b. at least one resistive element connected in series with at least one of the terminal sets selected from tthe group consisting of the primary terminals and the secondary terminals;

c. a thermal switching means having at least one switching component and a thermal sensing component, one of said switching component connected in parallel with one of the members selected from the group consisting of a first resistive element in (b) and a portion of the winding of the transformer in step (a), and said thermal sensing component positioned adjacent one of the members selected from the group consisting of a second resistive element in (b) and the transformer in (a), said member adjacent the thermal sensing component operable such that the temperature of the member will rise at least to a preselected level after a preselected time period of in line operation;

d. rectifier means connected to at least one set of secondary terminals of the transformer for converting the alternating current from said transformer to direct current, and e. output terminals coupled to the rectifier means and adapted for connecting to at least one secondary cell or battery so that when at least one cell or battery is coupled to said output terminals and an a.c. power source is coupled to the primary terminals, the cell or battery will receive an initial fast charging current until the temperature of said member adjacent the thermal sensing component increases to a preselected level which will cause said thermal sensing component to activate said switching component thereby altering the parameters of the circuit so as to decrease the charging current through the output terminals to a lower charge rate.

When the transformer is intended to be the member adjacent the thermal sensing component, then it has to be fabricated such that after operating under designed parameters, such as from a 120 a.c. power source, delivering at least about one-half an ampere, its temperature will increase above ambient temperature by a preselected level, such as between about 30°F and about 90°F, preferably between about 40°F and about 60°F, after a preselected time period, such as about 45 minutes, preferably about 20 minutes. The specific geographical area or controlled environment in which the charger of this invention is to be used may affect the temperature increase desired of the transformer during its operational mode since the ambient temperature at the specific area or environment may differ from other areas or environments. Thus the desired or preselected temperature rise for an in line operating transformer in the circuit of this invention may vary somewhat depending on the intended end use environment. However, the temperature rise or increase desired should be selected so that it will be reached in a time period sufficient to impart the initial fast charge to the cell or battery.

There is no transformer in existence today that can operate without some kind of energy loss. Inherent losses exist in the utilization of magnetic coupling in transformer applications, and said losses primarily result in heat which is normally dissipated by conventional heat sink means. One embodiment of the present invention utilizes sensing means to detect the heat buildup of the transformer during in-line operation and to activate a switching device to effect charge control when the heat detected is above a preselected level. By proper design of a transformer, the heat loss or buildup can be minimized or increased.

The $I^2R$ losses of a transformer which result in the generation of heat, can be regulated by using different grades and compositions of magnetic core materials, by altering the dimensions and grade of the copper wire used in the windings, by varying the location of the windings on the core material and/or by use of resistive type materials as conductors in the windings.

In conventional transformer designs, the core consists of separate laminations, the thickness of which affects the internal electrical energy losses. Thus the type of core material and its magnetic characteristics will influence the losses of a transformer. Likewise the gauge or wire size for the windings can be selected to introduce resistance to the transformer and consequently affect power losses or heat since the resistance of a wire varies inversely to the cross-sectional area and directly to its length. Consequently any artisan familiar with transformer design can construct a transformer which will operate at a temperature gradient such that it can be employed in the circuit of this invention to not only provide a means of timing the fast charge cycle but also to terminate it after a desired time period.

The secondary winding of the transformer may contain additional taps which when appropriately coupled to a rectifier of the circuit will provide a current output different and smaller than the current output from the terminals across the entire secondary winding. In this circuit arrangement, a large capacity cell or battery, such as a "C" or "D" size unit, could be coupled to the terminals across the entire secondary winding while a smaller capacity cell or battery, such as an "AA" size unit, could be coupled across a fraction of the secondary winding using the additional tap terminal. This would provide a means of charging different capacity cells simultaneously thereby providing greater versatility of the charger.

The dual charging rate switching device of this invention could also be implemented by employing a conventional type transformer along with a conventional first limiting resistive component and a second resistive component having the characteristics such that it would give rise to a temperature increase of a preselected amount after a preselected time period of in line operation, as specified above for the transformer. The heat characteristics of the second resistive component can be regulated by selecting the resistive material of the component such that it will generate heat when placed in an operating circuit, said heat being the normal $I^2R$ losses associated with resistive materials. As stated above, the composition and/or size of various resistive materials can be used to affect the necessary heat generation required for activating a thermal switching means after a preselected time period of in line operation. For example, the thermal switching means could be connected such that its switching component would shunt the limiting resistive component while the temperature sensing component would be positioned adjacent the second resistive component. In the operational mode of the charger, the switching component of the thermal sensing means would shunt the limiting resistive component thereby allowing for an initial large current flow, while the thermal sensing component was monitoring the second resistive component. After a preselected time period, the temperature rise in the second resistive element would cause the thermal sensing component to activate the switching component to the open position, thereby effectively coupling the limiting resistive element into the circuit. The current in the circuit would thereby decrease and consequently the charging current would decrease. The parameters of the transformer, power supply and resistors in the circuit should be chosen to provide an initial fast charge rate when the thermal switching component is closed, followed by a lower charge rate when the switch is open. A fast charge rate may last about 45 minutes, preferably about 20 minutes, while a lower charge rate could continue for extended periods without causing damage to the batteries or the components of the circuit.

The rectifier means for use in the circuit of this invention could be any one of the conventional type rectifier arrangements such as the half-wave rectifier, full-wave rectifier, full-wave bridge rectifier, full-wave center tap bridge rectifier, or the like. The primary requirement of the rectifier is that it convert an alternating current to a direct current, such direct current being required for the charging of cells or batteries.

The thermal switching means for use in the circuit of this invention could be any one of the conventional thermal switches which operate such that the switching component is held in a closed or open position until the thermal sensing component detects a temperature rise to a preselected level. Thereupon the switching component opens or closes thus causing the leg of the circuit incorporating said switch component to be disconnected or connected, respectively, in the circuit. A typical type thermal switch could contain a bimetal disc or strip adapted to maintain the switch in a closed or open position. Upon reaching a preselected temperature level, the bimetal disc or strip will snap or otherwise move, thereby opening or closing said terminals. This will effectively disconnect or connect the leg of the circuit, containing the switch contacts, in the circuit. When the temperature sensing component of the thermal switching means is adjacent the transformer in the dual switcing device of this invention, and the switching component is connected in parallel to a limiting resistive component in said device, the temperature rise in the transformer will effectively open said switching component after a preselected time period thereby placing the resistive component in the circuit. As stated above, this resistive component will effectively decrease the current flow in the output terminals of the charging device thereby decreasing the charge rate.

Other types of typical thermal switches suitable for use in the charging circuit of this invention include the conventional heat sensitive reed switches and relays which are commercially available. These devices could be coupled into the circuit as described above and function such that when a preselected temperature level is sensed, the devices would be activated to slightly alter the circuit to affect a decrease in the charge current at the output terminals of the charger.

The thermal switching means of this invention could be of a type that once the switching component was activated to the open or closed position, it would remain there until it was reset manually. This would insure against the switching component reverting back to its original state during the charging of cells or batteries if the temperature of the heat generating component fell below a certain level. Repetitive fast charge cycles at a high current level could possibly damage the battery or cell. This problem could also be eliminated if the heat generating component is designed to operate hot during the lower charge rate so that the thermal sensing component would maintain the switching component in the proper position once it was activated to that position.

The thermal switching means of this invention need not be limited to a single pair of contacts but may be constructed with two sets of contacts which are activated by a single thermal sensing component (FIG. 8). It is also possible to employ two thermal switching means in a single circuit having dual secondary windings on the transformer or some similar transformer circuit arrangement.

A normally closed switching component of the thermal switching means of this invention could also be coupled in parallel to a portion of the primary winding so that when activated by the sensing component due to a temperature rise in the heat generating component, it will effectively connect said portion of the winding into the primary circuit thereby affecting the voltage ratio of the primary to secondary. This will vary the voltage and current at the output terminals thereby changing the charge current rate from a fast charge rate to a lower charge rate.

A normally open switching component of the thermal switching means of this invention could also be coupled in parallel to a portion of the secondary winding so that when activated by the sensing component due to a temperature rise in the heat generating component, it will effectively short out said portion of the winding in the secondary circuit thereby affecting the voltage ratio of the primary to secondary. This will vary the voltage and current at the output terminals thereby changing the charge current rate from a fast charge rate to a lower charge rate.

In the circuit embodiment wherein the switching component shunts a limiting resistive component, then the resistive component can be coupled in series with the primary terminals or the secondary terminals so as to limit the charge current at the terminals of the secondary circuit which are adapted for coupling to at least one rechargeable cell or battery.

The secondary circuit should have at least one additional limiting resistive component coupled in series to the output terminals. This resistive component may be of the variable type, such as a rheostat, to enable the charging current to be altered to accommodate the charging of different capacity cells or batteries.

Another circuit arrangement would entail the use of parallel connected resistors coupled to the rectifier means in the secondary loop of the transformer, each of said resistors being connected in series with output terminals. The resistors could be selected such that in one branch of the parallel arrangement a charging current suitable for charging AA size cells or batteries would flow, while in the second branch a charging current suitable for charging D or C size cells would flow. Thus this parallel arrangement would provide another circuit configuration for simultaneously charging different size and capacity cells or batteries.

More than one rechargeable cell or battery can be simultaneously charged by connecting them in series to the output terminals of the secondary loop of the transformer. This is practical since the back E.M.F. and the internal resistance of cells and batteries is rather low and will not effectively alter the magnitude of the charging current. For example, the internal resistance of a NiCd cell is lower than about 30 milliohms. Thus in addition to simultaneously charging different size and capacity cells or batteries, the charging device of this invention can be used to charge a plurality of the same size cells or batteries although a series connection of 6 or less cells or batteries would be preferable.

The ratio of the amplitude of the current for the lower charge rate should be between about 20/1 and about 5/1, with a ratio of about 10/1 being preferable. The magnitude of the current for the fast charging of various capacity cells will depend on the specific cell.

For example, D and C capacity cells could be given a fast charge of between about 0.8 ampere and about 1.4 amperes, preferably about 1.2 amperes, for a specific period such as between about 20 and about 45 minutes, preferably about 30 minutes, while AA cells should be charged at between about 0.4 and about 0.6 ampere, preferably about 0.5 ampere, for a period of between about 20 and about 45 minutes, preferably about 30 minutes. However, as new cells and batteries are developed, the charge current for the fast charge rate may change. With the introduction of rechargeable nickel-cadmium (NiCd) cells to the home appliance market, shorter charging times for such cells are required if such appliances are to be accepted by the public. In such appliance systems, a fast charge time of 45 minutes or less would be desirable, although a 1 hour fast charge time would be acceptable. Thereafter a lower charge rate could be delivered to the cell for substantially long periods of time.

The Eveready "Hustler" fast charge nickel-cadmium cell (produced by Union Carbide Corporation) is admirably suited for use in the dual charging rate switching device of this invention, since even in the fully charged state, the cell can be overcharged at a fast rate for about 20 minutes without sustaining permanent damage. Consequently, the inadvertent charging of fully charged Hustler cells using this invention would not cause damage to the cells or to the components of the circuit of this invention.

It is also within the scope of this invention to have as the thermal sensing means a component, such as a thermistor, having a positive temperature coefficient such that its resistance would increase rather abruptly at predetermined temperature levels. Such a component could be coupled into the circuit of this invention as the limiting resistive component and positioned adjacent the transformer or a heat generating resistor. After a preselected temperature rise in the transformer or in the heat generating resistor, the resistance of the component will automatically increase thereby altering the parameters of the circuit and thus decreasing the charge current at the output terminals of the circuit. Ceramics, such as barium titanate ceramic materials, are admirably suited as the thermal sensing means for this invention since they can be formulated to repeatably change their conductivity rather abruptly from high to relatively low levels at a predetermined temperature.

The understanding of the invention can be facilitated by reference to the drawings in which:

FIG. 1 is a circuit diagram showing an embodiment of this invention.

FIG. 2 is a partial circuit diagram showing an alternate embodiment of this invention.

FIG. 3 is a circuit diagram of an alternate embodiment of this invention.

Figure 4:
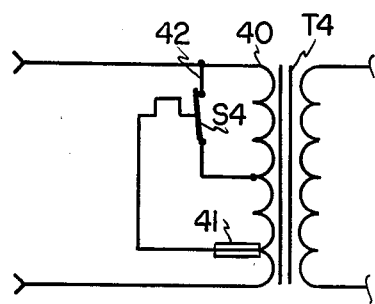
FIG. 4 is a partial circuit diagram showing an alternate embodiment of this invention.

Referring to FIG. 1, the dual charge rate switching device 1 is provided with output terminals 2 and 3 for connecting to rechargeable cells or batteries, B1 and B2, respectively. The device includes a transformer T1 having a primary winding 4 and secondary winding 5. Primary terminals 6 are adapted to connect to an alternating power supply P1. Limiting resistor R1 is connected in series with terminals 6 and in parallel with the switching component 13 of switch S1, while the thermal sensing component 12 is positioned adjacent transformer T1. Switching component 13 is normally in the closed position, thereby shunting resistor R1. Full-wave center tap rectifier bridge D1 to D4 is coupled across the secondary winding 5 for the purposes of converting alternating current to direct current. Terminal 7 of the bridge rectifier is coupled to resistor R2 with the opposite end of resistor R2 coupled to one of the output terminals 2 while the other output terminal 2 is coupled to the center tap 8 of winding 5. Terminal 9 of the bridge rectifier is coupled to resistor R3 with the opposite end of resistor R3 coupled to one of the output terminals 3, while the other terminal 3 is coupled to center tap 8 of winding 5. This center tap bridge rectifier arrangement provides a full-wave rectification for circuit legs 10 and 11. Resistor R2 and R3 can be selected such that the current flow in each leg will be able to accommodate the charging of D and C, or AA size cells or batteries. Preferably, one leg of the circuit should accommodate the charging of C or D size cells, while the other leg of the circuit should be adapted to accommodate AA size cells. In the operational mode of the circuit, terminals 6 are coupled to an alternating current source P1, while rechargeable batteries or cells are disposed interminals 2 and/or 3 with the polarity as shown. Switching component 13 of switch S1 is normally closed thereby shunting R1 and allowing for maximum charge current to flow in the secondary circuit loop. Bridge rectifier D1–D4 converts the alternating current from winding 5 to direct current which is then fed to charge batteries or cells B1 and/or B2. After a predetermined time period, the temperature of the transformer will increase to a level whereby the thermal sensing component 12 will effectively place the switching component 13 into the open position thereby placing R1 in the primary circuit loop. This will decrease the current in the primary loop, and consequently the secondary loop, thus causing the charging current to change from a fast charge rate to a lower charge rate. Batteries or cells B1 and/or B2 can remain in the circuit on a lower charge rate for long periods of time without sustaining damage. Each set of terminals 2 and 3 may be shorted when they are not connected to batteries or cells so that when one or more batteries or cells are placed in one of the circuit legs 10 or 11, the other leg containing a resistor will be coupled into the circuit. This will provide for a relatively constant current flow in each of the legs 10 and 11. In addition, the heat of the resistors can be utilized to aid in maintaining the switching component in the activated state thereby maintaining the lower charge rate for the cells or batteries.

FIG. 2 shows an alternate embodiment for coupling the thermal switching means into the circuit. Here normally closed switching component 21 of switch S2 is coupled in parallel to a limiting resistor R20 in the primary circuit loop of transformer T2. The thermal sensing component 20 of S2 is positioned adjacent resistor R21 and will effectively activate switching component 21 to the open position when the temperature of resistor R21 increases to a preselected level after a preselected time period. Once switch S1 is activated into the open position, the current I1 in the primary loop will decrease due to the addition of R20 in the circuit and thus the charging current I2 will decrease.

FIG. 3 shows a dual rate switch unit comprising a transformer T3 having a full-wave center tap rectifier DI-D2 coupled to the secondary loop of T3. Resistors R30 and R31 are coupled to rectifier terminal 36 with the opposite ends connected to output terminals 33 and 34, respectively, which are adapted to receive one or more batteries or cells. The opposite end of terminals 33 and 34 are coupled to limited resistor R32 which in turn is connected to tap 37 on the secondary winding of transformer T3. Switching component 38 of switch S3 is coupled in parallel with resistor R32, and thermal sensing component 39 is positioned adjacent T3. In the operating mode of the circuit, thermal sensing component 39 will effectively open switching component 38 of S3 whenever the temperature of the transformer increases to a preselected level. This will effectively place resistor R32 into the circuit and thereby decrease the charging current in circuit legs 30 and 31.

The switching component of the thermal switching means of this invention could also be connected in parallel to a portion of the primary winding as shown in FIG. 4. Normally closed switching component 42 of switch S4 is shown coupled in parallel to a portion of primary winding 40 of transformer T4, and the thermal sensing component 41 of S4 is positioned adjacent said transformer T4. In the operating mode of the circuit, thermal sensing component 41 will effectively open switching component 42 whenever the temperature of transformer T4 increases to a preselected level. This will effectively connect the shunted portion of the primary winding 40 into the primary circuit loop thereby changing the turns ratio and primary voltage thus effectively decreasing the current flow in the secondary circuit loop and consequently the charging current in the secondary loop.

Figure 5:
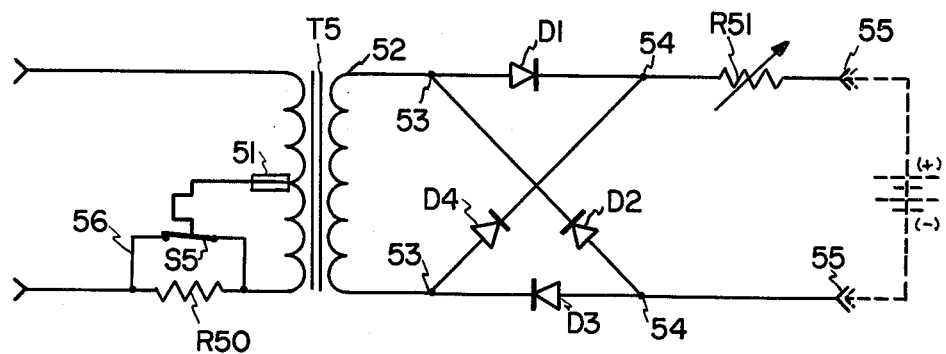
FIG. 5 is a circuit diagram of an alternate embodiment of this invention.

FIG. 5 illustrates another embodiment of the invention wherein the primary circuit loop of transformer T5 contains a series connected resistor R50 which is shunted by normally closed switching component 56 of switch S5. The sensing component 51 of switch S5 is positioned adjacent transformer T5 and operates as described above in conjunction with FIG. 1. In the secondary circuit loop a conventional full-wave rectifier bridge D1-D4 is coupled at its input terminals 53 to the secondary winding 52 and at its output terminals 54 to a variable resistor R51 and battery output terminals 55. This circuit arrangement functions as generally described above and has the additional feature whereby the charging current in the battery output terminals 55 can be varied to accommodate different capacity batteries or cells. Thus when cells having different capacity rating, and hence charge rates, are coupled to terminals 55, the charging current can be adjusted by variable resistor R51 to the specific current requirements of said cells.

Figure 6:
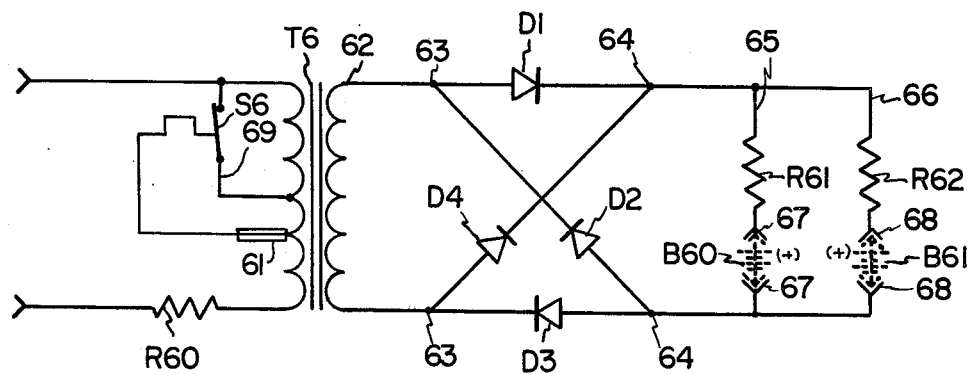
FIG. 6 is a circuit diagram of an alternate embodiment of this invention.

Another embodiment of this invention is shown in FIG. 6 wherein the primary circuit loop of transformer T6 contains normally closed switching component 69 of switch S6 which shunts a portion of the primary winding of T6. The sensing component 61 of switch S6 is positioned adjacent transformer T6 and operates as described above in conjunction with FIG. 4. In the secondary circuit loop a conventional full-wave rectifier bridge D1-D4 is coupled at its input terminals 63 to the secondary winding 62 of transformer T6 and at its output terminals 64 to parallel connected circuit legs 65 and 66 containing resistors R61 and R62, respectively, and output terminals 67 and 68, respectively, said output terminals being adapted for connection to at least one rechargeable cell or battery B60 and B61, respectively. This circuit arrangement functions as described above in conjunction with FIG. 1 except that a full-wave rectifier bridge is used in place of the center tap full-wave bridge in the secondary circuit loop and the primary circuit loop is connected as shown in FIG. 4.

Figure 7:
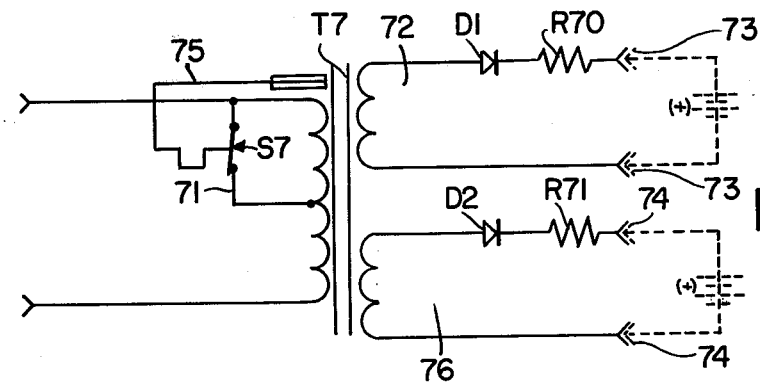
FIG. 7 is a circuit diagram showing an alternate embodiment of this invention.

Another embodiment of this invention is shown in FIG. 7 wherein the primary circuit loop of transformer T7 contains normally closed switching component 71 of switch S7 which shunts a portion of the primary winding of T7. The thermal sensing component 75 is positioned adjacent transformer T7. The secondary circuit of T6 comprises a dual secondary winding arrangement with a first secondary circuit loop 72 containing a half-wave rectifier D1 coupled to resistor R70 which in turn is coupled to output terminals 73. The second circuit loop 76 contains a half-wave rectifier D2 coupled to resistor R71 which in turn is connected to output terminals 74. The output terminals 73 and 74 are adapted for connecting to rechargeable cells or batteries shown in broken lines. As described above in conjunction with FIG. 4, the thermal sensing component 75 will activate switching component 71 when the transformer reaches a preselected temperature level. This will connect additional windings into the primary circuit thereby changing the turns ratio and voltage of the circuit thus effectively decreasing the current flow in each of the secondary loops.

Figure 8:
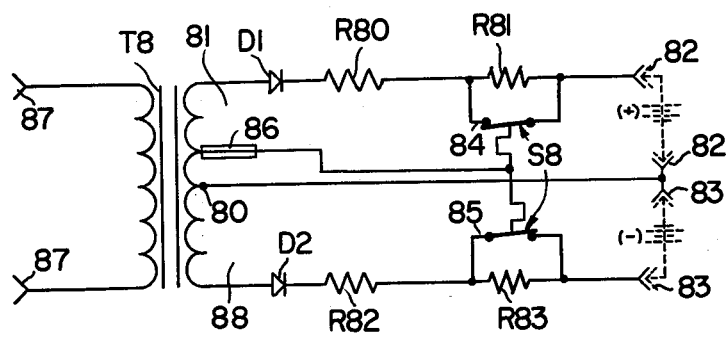
FIG. 8 is a circuit diagram showing an alternate embodiment of this invention.

The circuit arrangement of FIG. 8 shows a transformer T8 having a common tap terminal 80 connected to the two secondary circuit loops 81 and 88. The first circuit loop 81 contains a half-wave rectifier D1 connected in series to resistors R80 and R81, with the latter connected to output terminals 82. The second circuit loop 88 contains a half-wave rectifier D2 connected in series to R82 and R83, with the latter connected to output terminals 83. A dual contact switch S8 is shown with the first normally closed switching component 84 connected in parallel across resistor R81 and the second normally closed switching component 85 connected in parallel across resistor R83. Both switching components 84 and 85 are controlled by thermal sensing component 86 which is shown positioned adjacent transformer T8. In the operational mode of the circuit, batteries or cells are connected to output terminals 82 and 83, and the primary termainsl 87 are connected to an a.c. power source (not shown). After a preselected time period, the transformer T8 will heat to a temperature level sufficient to cause thermal sensing component 86 to activate switching components 84 and 85 to the open positions thereby connecting resistors R81 and R83 into the secondary circuit loops 81 and 88, respectively. This added resistance in the secondary loops will decrease the current in the loops thus decreasing the charging rate for the batteries or cells connected to the output terminals.

Figure 9:
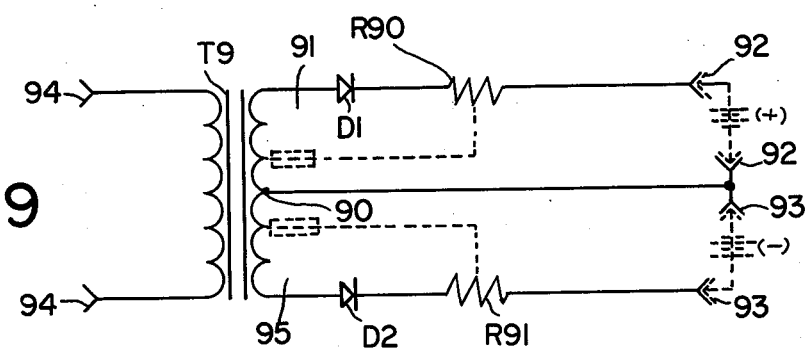
FIG. 9 is a partial circuit diagram showing an alternate embodiment of this invention.

FIG. 9 shows a similar type circuit arrangement as in FIG. 8 except that a positive temperature coefficient device is used as the thermal switching means. As shown in FIG. 9, the secondary of transformer T9 contains two circuit loops connected in common to an additional tap 90 on the secondary winding. The first circuit loop 91 contains a half-wave rectifier D1 connected in series to a positive temperature coefficient device R90 which in turn is connected to output terminals 92. The second circuit loop 95 contains a half-wave rectifier D2 connected in series to positive temperature coefficient device R91 which in turn is connected to output terminals 93. Devices R90 and R91 are positioned adjacent transformer T9 as shown by the broken lines but are electrically connected in the circuit as shown by solid lines. In the operational mode of the circuit, batteries or cells are connected to the output terminals 92 and 93, and the primary terminals 94 are connected to an a.c. power source (not shown). After a preselected time period, the transformer T9 will heat to a temperature level sufficient to decrease the conductance of devices R90 and R91, thereby decreasing the current flow in the secondary circuit loops and consequently the charging current to the output terminals.

Figure 10:
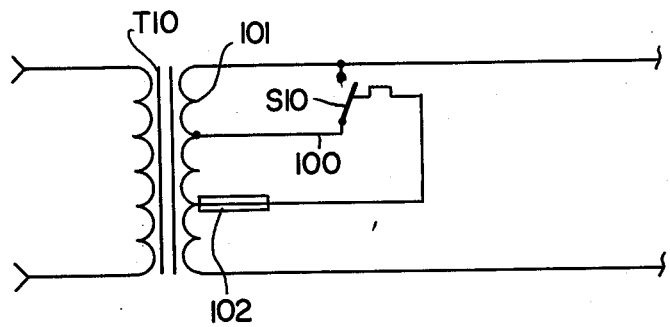
FIG. 10 is a partial circuit diagram showing an alternate embodiment of this invention.

The switching component of the thermal switching means of this invention could also be connected as shown in FIG. 10. Normally open switching component 100 of switch S10 is shown coupled in parallel to a portion of the secondary winding 101 of transformer T10, and the thermal sensing component 102 is positioned adjacent said transformer T10. In the operating mode of the circuit, thermal sensing component 102 will effectively close switching component 100 whenever the temperature of transformer T10 increases to a preselected level. This will effectively shunt the portion of the secondary winding 101 out of the secondary circuit loop thereby changing the turns ratio and secondary voltage, thus effectively decreasing the current flow in the secondary circuit loop and consequently the charging current at the output terminals.

EXAMPLE 1

A circuit as shown in FIG. 1 was assembled using the following value and type components:

Si = A normally closed snap-action thermal switch Type 2450 as supplied by Elmwood Sensors, Inc. The switch was designed to be activated from the closed position to the open position when the sensing element reached a temperature of 150°F. and revert to the closed position at a temperature of 110°F.

T1 = A 300 ma, 40V transformer Type F-91X as supplied by Triad Distributors, Division of Litton Industries.

R1 = 600 ohms, 10 watts.
R2 = 18 ohms, 25 watts.
R3 = 7.5 ohms, 25 watts.
D1–D3 = IN 4720.
B1 = 3, AA size.
B2 = 3, sub c size.

The cells designated B1 and B2 in FIG. 1 were AA size and sub c size, respectively, and each was substantially discharged as indicated by a voltage reading of only 0.9 volt taken across a resistive load connected to the cell. Three of each cell size were coupled to the output terminals of the circuit and a 120-volt alternating current was supplied to the input terminals of the primary loop of the transformer. With the switching component in the normally closed position, resistor R1 was shunted thereby producing a current flow of approximately 500 milliamperes in circuit leg 10 and approximately 1.2 amperes in circuit leg 11 as shown in FIG. 1. These relatively high charging currents were sufficient to provide a fast charge rate for each type cell. After about 20 minutes of in-line operation, the temperature of the transformer core increased to 153°F., which was sufficient to cause the thermal sensing component to open the switching component of the switch means, thereby effectively placing resistor R1 in the primary circuit loop. This added resistance to the primary circuit loop decreased the current flow in the loop and, consequently, the current in the secondary circuit loop. The current in circuit leg 10 was reduced to 150 milliamperes and in circuit leg 11 to 400 milliamperes. This lower current charge rate was discontinued and after the cells were removed from the charger they were found to be substantially charged.

EXAMPLE 2

A circuit was assembled as shown in FIG. 8 except that two thermal switches were used instead of a double contact switch. Switch S1 was assembled in circuit loop 81 with the thermal sensing component positioned adjacent the core of the transformer while switch S2 was assembled in circuit loop 88 with the thermal sensing component positioned adjacent the windings of the transformer. The following value and type component were used:

S1 and S2 were normally closed snap-action thermal switches Type 2450 as supplied by Elmwood Sensors, Inc. The switches S1 and S2 were to be activated from the open position to the closed position when the sensing elements reached a temperature of 125°F. ±5% and 138°F. ±5%, respectively, and reset at a temperature of 96°F.

T8 was a Special Multiple secondary tap transformer supplied by Schumacher Electric Corp. Chicago, Illinois.

R80 was 9 ohms, 10 watts
R81 was 120 ohms, 1 watt
R82 was 4 ohms, 10 watts
R83 was 48 ohms, 5 watts
D1 and D2 were 1N 2071 silicon diodes
B1 was 3 AA size cells
B2 was 3 sub c size cells The cells designated B1 and B2 in FIG. 8 were AA size and sub c size, respectively, and each was substantially discharged as indicated by a cell closed circuit voltage, after constant current discharge, of only 0.9 volt. Three of each cell size were coupled to the output terminals of the circuit and a 120-volt alternating current was supplied to the input terminals of the primary loop of the transformer. With the switching components in the normally closed position, resistor R82 was shunted thereby producing a current flow of approximately 500 milliamperes in circuit loop 81 and with R83 shunted in loop 88, a current of approximately 1.2 amperes was produced. These relatively high charging currents were sufficient to provide a fast charge for each type cell. After about 20 minutes of 'in line' operation, the temperature of the transformer increased to 138°F. on the winding and 125°F. on the core which was sufficient to cause the thermal sensing components to open the switching components of the switching means, thereby effectively placing resistors R81 and R82 in the secondary circuit loops. This added resistance to the secondary circuit loops decreased the current flow in the respective loops and, consequently, the charge current. The current in circuit loop 81 was reduced to 50 milliamperes and in circuit loop 88 to 120 milliamperes. This lower current charge rate was continued for 1¾ hours after which the cells were removed and found to be effectively charged as determined by constant current discharge at 1 hour rate for each type. Thus about 40% rated capacity was obtained after a 2 hour charge period.

While the invention has been described in conjunction with the specific circuitry shown in the drawing, it is obvious that certain modifications may be made to the invention, without deviating from the scope of the invention.

What is claimed is:

1. An automatic dual charging rate switching device for secondary cells and batteries which is capable of delivering an initial fast charging current followed automatically by a lower charging current comprising:
   a. a transformer having primary and secondary windings coupled to at least one primary and at least one secondary set of terminals, respectively;
   b. a resistive element connected in series with one of said terminal sets;
   c. a thermal switching means having at least one switching component and a thermal sensing component, one of said switching component connected in parallel across said resistive element, and said thermal sensing component positioned adjacent said transformer, said transformer operable such that the temperature of the transformer will increase between about 30°F. and about 90°F. after a time period of in line operation between about 20 minutes and about 45 minutes;
   d. rectifier means connected to at least one set of secondary terminals of the transformer for converting alternating current from said transformer to direct current; and
   e. output terminals for the rectifier means which are adapted for connecting to at least one secondary cell or battery so that when at least one secondary cell or battery is coupled to said output terminals and an alternating current power source is coupled to the primary terminals of the transformer, the secondary cell or battery will receive an initial fast charging current until the temperature of said transformer increases to within the above temperature range which will cause said thermal sensing component to activate said switching component thereby altering the parameters of the circuit so as to decrease the charging current through the output terminals to a lower charge rate.

2. The automatic dual charging rate switching device of claim 1 wherein said switching component is normally closed and wherein said resistive element is coupled in series to the primary winding of the transformer.

3. The automatic dual charging rate switching device of claim 1 wherein said switching component is normally closed and wherein said resistive element is coupled to the secondary winding circuit of the transformer.

4. The automatic dual charging rate switching device of claim 1 wherein the transformer has dual secondary windings each having a secondary set of terminals coupled to rectifier means and output terminals.

5. The automatic dual charging rate switching device of claim 1 wherein the transformer has an additional tap terminal on the secondary winding; wherein a first rectifier means coupled to output terminals is connected between one terminal of the secondary winding and the addition tap terminal; wherein a second rectifier means coupled to output terminals is connected between a second terminal of the secondary winding and the additional tap terminal; and wherein said thermal switching means has two switching components with one of the switching components connected in parallel across said resistive element coupled in series with said first rectifier means and the second switching component connected in parallel across a second resistive element coupled in series with said second rectifier means.

6. The automatic dual charging rate switching device of claim 1 wherein a variable resistor is coupled in series to the output terminals.

7. An automatic dual charging rate switching device for secondary cells and batteries which is capable of delivering an initial fast charging current followed automatically by a lower charging current comprising:
   a. a transformer having primary and secondary windings coupled to at least one primary and at least one secondary set of terminals, respectively;
   b. a thermal switching means having a switching component and a thermal sensing component, said switching component connected in parallel across a portion of the winding of said transformer and said thermal sensing component positioned adjacent said transformer, said transformer operable such that the temperature of said transformer will increase between about 30°F. and about 90°F. after a time period of in line operation between about 20 minutes and about 45 minutes:
   c. rectifier means connected to at least one set of secondary terminals of the transformer for converting alternating current from said transformer to direct current; and
   d. output terminals for the rectifier means which are adapted for connecting to at least one secondary cell or battery so that when at least one secondary cell or battery is coupled to said output terminals and an alternating current power source is coupled to the primary terminals of the transformer, the secondary cell or battery will receive an initial fast charging current until the temperature of said transformer increases to within the above temperature range which will cause said thermal sensing component to activate said switching component thereby altering the parameters of the circuit so as to decrease the charging current through the output terminals to a lower charge rate.

8. The automatic dual charging rate switching device of claim 7 wherein said switching component is normally closed and is connected in parallel across a portion of the primary windings.

9. The automatic dual charging rate switching device of claim 7 wherein said switching component is normally opened and is connected in parallel across a portion of the secondary windings.

10. The automatic dual charging rate switching device of claim 7 wherein the transformer has dual secondary windings each having a secondary set of terminals coupled to rectifier means and output terminals.

11. The automatic dual charging rate switching device of claim 8 wherein the transformer has an additional tap terminal on the secondary winding; wherein a first rectifier means coupled to output terminals is connected between one terminal of the secondary winding and the additional tap terminal and a second rectifier means coupled to output terminals is connected between a second terminal of the secondary winding and the additional tap terminal.

12. The automatic dual charging rate switching device of claim 7 wherein a variable resistor is coupled in series to the output terminals.

13. An automatic dual charging rate switching device for secondary cells and batteries which is capable of delivering an initial fast charging current followed automatically by a lower charging current comprising:
   a. a transformer having primary and secondary windings coupled at at least one primary and at least one secondary set of terminals, respectively;
   b. a first resistive element connected in series with one of said terminal sets and a second resistor connected to one of said terminal sets;
   c. a thermal switching means having at least one switching component and a thermal sensing component, one of said switching component connected in parallel across said first resistive element, and said thermal sensing component positioned adjacent said second resistive element, said second resistive element operable such that the temperature of the second resistive element independent of the temperature of a cell or battery being charged will increase between about 30°F. and about 90°F. after a time period of in line operation between about 20 minutes and about 45 minutes;
   d. rectifier means connected to at least one set of secondary terminals of the transformer for converting alternating current from said transformer to direct current; and
   e. output terminals for the rectifier means which are adapted for connecting to at least one secondary cell or battery so that when at least one secondary cell or battery is coupled to said output terminals and an alternating current power source is coupled to the primary terminals of the transformer, the secondary cell or battery will receive an initial fast charging current until the temperature of said second resistive element increases to within the above temperature range which will cause said thermal sensing component to activate said switching component thereby altering the parameters of the circuit so as to decrease the charging current through the output terminals to a lower charge rate.

14. The automatic dual charging rate switching device of claim 13 wherein said switching component is normally closed and is connected in parallel across said first resistive element which is coupled in series to the primary winding of the transformer.

15. The automatic dual charging rate switching device of claim 13 wherein said switching component is normally closed and is connected in parallel across said first resistive element which is coupled to the secondary winding circuit of the transformer.

16. The automatic dual charging rate switching device of claim 13 wherein the transformer has dual secondary windings each having a secondary set of terminals coupled to rectifier means and output terminals.

17. The automatic dual charging rate switching device of claim 13 wherein the transformer has an additional tap terminal on the secondary winding and wherein a first rectifier means coupled to output terminals is connected between one terminal of the secondary winding and the additional tap terminal and a second rectifier means coupled to output terminals is connected between a second terminal of the secondary winding and the additional tap terminal.

18. The automatic dual charging rate switching device of claim 14 wherein said thermal switching means has two switching components and wherein one of the switching components is connected in parallel across said first resistive element which is coupled to one of the secondary windings and the second switching component is connected in parallel across a third resistive element which is coupled to the second secondary winding.

19. The automatic dual charging rate switching device of claim 17 wherein said thermal switching means has two switching components and wherein one of the switching components is connected in parallel across said first resistive element which is coupled to the first rectifier means and the second switching component is connected in parallel across a third resistive element which is coupled to the second rectifier means.

20. The automatic dual charging rate switching device of claim 13 wherein a variable resistor is coupled in series to the output terminals.

21. An automatic dual charging rate switching device for secondary cells and batteries which is capable of delivering an initial fast charging current followed automatically by a lower charging current comprising:
   a. a transformer having primary and secondary windings coupled to at least one primary and at least one secondary set of terminals, respectively;
   b. a first resistive element connected in series with one of the terminal sets;
   c. a thermal switching means having at least one switching component and a thermal sensing component, one of said switching component connected in parallel across a portion of the winding of the transformer; and said thermal sensing component positioned adjacent said first resistive element, said first resistive element operable such that the temperature of said first resistive element will increase between about 30°F. and about 90°F. after a time period of in line operation between about 20 minutes and about 45 minutes;
   d. rectifier means connected to at least one set of secondary terminals of the transformer for converting alternating current from said transformer to direct current; and
   e. output terminals for the rectifier means which are adapted for connecting to at least one secondary cell or battery so that when at least one secondary cell or battery is coupled to said output terminals and an alternating current power source is coupled to the primary terminals of the transformer, the secondary cell or battery will receive an initial fast charging current until the temperature of said first resistive element increases to within the above temperature range which will cause said thermal sensing component to activate said switching component thereby altering the parameters of the circuit so as to decrease the charging current through the output terminals to a lower charge rate.

22. The automatic dual charging rate switching device of claim 21 wherein said switching component is normally closed and is connected in parallel across a portion of the primary windings.

23. The automatic dual charging rate switching device of claim 21 wherein said switching component is normally opened and is connected in parallel across a portion of the secondary windings.

24. The automatic dual charging rate switching device of claim 22 wherein the transformer has dual secondary windings each having a secondary set of terminals coupled to rectifier means and output terminals.

25. The automatic dual charging rate switching device of claim 22 wherein the transformer has an additional tap terminal on the secondary winding and wherein a first rectifier means coupled to output terminals is connected between one terminal of the secondary winding and the additional tap terminal and a second rectifier means coupled to output terminals is connected between a second terminal of the secondary winding and the additional tap terminal.

26. The automatic dual charging rate switching device of claim 21 wherein a variable resistor is coupled in series to the output terminals.

* * * * *

UNITED STATES PATENT OFFICE
CERTIFICATE OF CORRECTION

Patent No. 3,911,350                    Dated October 7, 1975

Inventor(s) Thelbert A. Swope

It is certified that error appears in the above-identified patent and that said Letters Patent are hereby corrected as shown below:

Column 2, bridging lines 29 and 30, the words "for sensing the temperature of the cell or battery" have been repeated.

Column 2, line 56, "tthe" should be -- the --.

Column 11, line 57, "25 watts" should read -- 20 watts --.

Column 16, line 11, "14" should read -- 16 --.

Signed and Sealed this twenty-fourth Day of February 1976

[SEAL]

Attest:

RUTH C. MASON
Attesting Officer

C. MARSHALL DANN
Commissioner of Patents and Trademarks